Aug. 17, 1926.
R. E. FULTON
1,596,422
GREASE RETAINER
Filed August 4, 1923
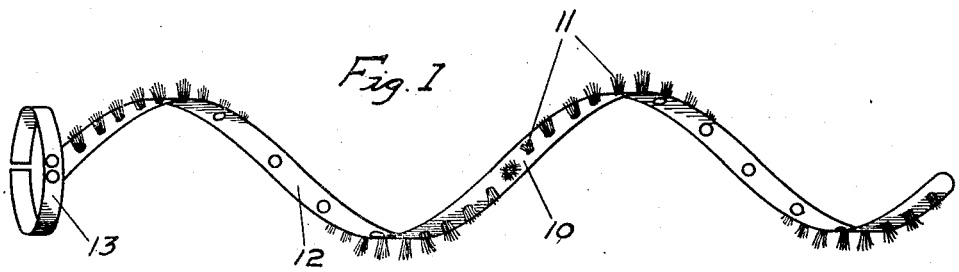
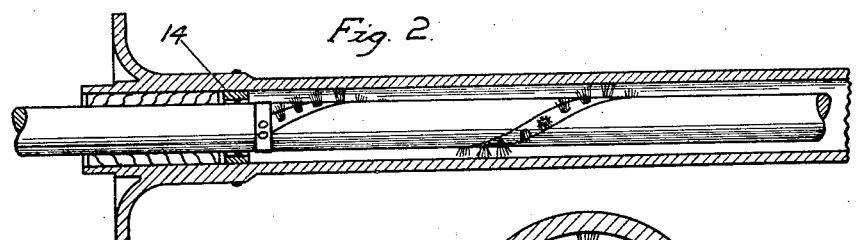
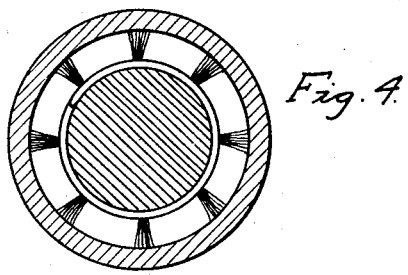
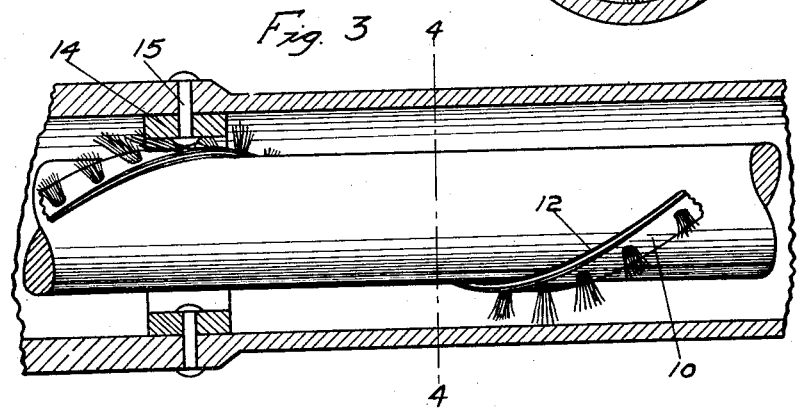
R. E. FULTON   INVENTOR.
BY
Emil F. Lang
ATTORNEY.

Patented Aug. 17, 1926.

1,596,422

UNITED STATES PATENT OFFICE.

RALPH E. FULTON, OF LINCOLN, NEBRASKA.

GREASE RETAINER.

Application filed August 4, 1923. Serial No. 655,732.

My invention relates to grease retainers, and it is specially designed for use on Ford automobiles for preventing leakage of the oil and grease from the outer ends of the casing of the rear axle.

In some types of automobiles the grease which lubricates the differential and rear axle has a strong tendency to creep outwardly toward the wheel hubs. When loose joints are encountered, usually near the wheel hubs, the grease will drip or flow out through the loose joint, this being especially aggravating when the grease is warm and in more or less of a fluid condition. The waste of grease, the liability of insufficient lubrication of the differential, and the presence of grease on the garage floor are all objectionable. Some makes of automobiles are so designed and constructed as to eliminate this trouble, but my invention relates more particularly to an attachment for use on cars in which the trouble has been found to occur.

Owing to certain peculiarities in the construction of the rear axle housing of the Ford automobile, and particularly to the inner flange which serves as an abutment for the roller bearings of the rear wheels, it has heretofore been found difficult to overcome this trouble in the Ford automobile.

The object of my invention is the provision of a device which will effectively prevent the grease from moving toward the wheel hubs, and which at the same time may be put into place with the minimum of effort without the use of special means. While designed especially for use on the Ford automobile, it may nevertheless be used on any automobile in which the same trouble occurs.

Having in view these objects and others which will appear in the description, I will now refer to the drawings, in which—

Figure 1 is a view of the grease retainer as seen from its side.

Figure 2 is a view of my grease retainer secured to the axle, with the rear axle housing being shown sectioned in order to show the relation of the grease retainer to the axle housing.

Figure 3 is an enlarged view of a portion of the grease retainer, axle, and housing while the brushes are being forced past the flange and rivet heads.

Figure 4 is a section on the line 4—4 of Figure 3.

In my preferred construction, I provide a metallic resilient band 10 with a series of apertures extending from end to end of the band. I then secure brushes 11 through the apertures, after which I secure a second band 12 to the band 10 by means of rivets or in any other suitable manner. I then secure a ring 13 to the end of the band, as shown in Figures 1 and 2.

The spiral band 10—12 must be of a length substantially equal to the axle housing between the differential and the wheel hub. The diameter of the spiral coil as well as the diameter of the ring 13 must be equal to or a trifle less than the diameter of the rear axle of the automobile. The ring 13 is preferably left open diametrically opposite its point of attachment to the band 10—12. When the device is in place, the outer ends of the brushes 11 just touch the inner wall of the casing, as seen in Figure 4.

Owing to the destructive action of grease on organic materials, brushes made of animal or vegetable bristles, or wipers made of felt or rubber are wholly unsuitable for this purpose, since the life of such materials is too short to make them serviceable. I prefer to use steel bristles similar to those used in wire brushes, but it is obvious that brass or other metals may be employed for this purpose. Similar remarks apply of course to the material out of which the bands 10 and 12 and the ring 13 are constructed. In order that the device may act efficiently as a screw conveyor of the grease, the brushes must be long enough to sweep the entire space between the axle housing and the axle. Shorter brushes would permit a large portion of the hot grease to escape to the wheel hub and thus to leak out.

I am aware that devices having a similar object in view are old, but none of these has come into general use because of defects in their design. In general, the prior devices are open to two serious objections. Either the web of the spiral conveyor does not have sufficient depth to effectively retain the grease or it is impossible to put the device into place without disassembling the rear axle system of the Ford automobile. This is due to the construction of the rear axle housing of the Ford car, as shown in Figures 2 and 4. The housing is provided with an internal ring or flange 14 to serve as an abutment for the roller bearings. The ring or flange 14 is secured to the housing by means of rivets 15, and the heads of the rivets extend a considerable distance into the space within the housing. The housing thus has a restricted throat which prevents the passage therethrough of an unyielding spiral web having an external diameter which is greater than the distance between the heads of two opposed rivets 15.

I make the helical web of my device of a series of metallic and highly resilient brushes, thus overcoming the two difficulties heretofore encountered. As shown in Figure 3, the brushes will yield as they pass the flange and bolt heads, and they will as readily resume their radial positions after they have passed into the interior of the housing. While the brushes may be mounted so close together that they will form a continuous web, I prefer to space them some distance apart.

The ring 13 is designed to serve primarily as a handle in case it ever becomes desirable to remove the device from the axle, in which case it may be withdrawn by means of a button hook or an improvised wire hook. Ordinarily however the device may remain in position indefinitely, since it is not subjected to any destructive action, either mechanical or chemical. When in place the ring 13 also supplements the clamping action of the helical band, thus assisting in preventing slippage of the device on the shaft.

Assuming that a pair of these devices has been properly placed on the rear axle, the result during the motion of the car is that of a screw conveyor within the axle housing for causing the oil and grease to flow toward the differential from both sides instead of toward the wheel hubs. I have subjected the device to severe tests and have found that with its use no grease whatever can reach the ends of the housing nor leak out.

The device can be manufactured and sold at a very low price. It is easily installed by anyone and without the use of special tools. When once installed it requires no further attention, and it will outlast the axle to which it is secured. It acts throughout every portion of the grease chamber of the rear axle housing and thus prevents the escape of any oil under even the most trying conditions. Its use reduces the cost of upkeep of tires, as oil on pavements and garage floors is one of the most destructive agents for shortening the life of tires.

Having thus described my invention in terms which will be readily understood by others skilled in the art to which it pertains, what I believe to be new and desire to secure by Letters Patent of the United States is:—

A grease retainer formed from a flat band of relatively thin resilient material and having a helical form, outwardly projecting metallic bristles secured through apertures in said band, a second metallic band secured to the first said band to prevent displacement of said bristles and to assist in maintaining the helical form of said band, and a split ring of resilient material secured midway between its extremities to said helical band at its outer extremity, said helical band being of a length to extend from the differential to the outer bearing in the rear axle housing of an automobile.

In testimony whereof I affix my signature.

RALPH E. FULTON.